(12) United States Patent
Kalisz et al.

(10) Patent No.: US 8,171,836 B2
(45) Date of Patent: May 8, 2012

(54) PRE-WEAKENED SKIN SEAM FOR AN AIR BAG DEPLOYMENT COVER

(75) Inventors: Raymond E. Kalisz, Livonia, MI (US); Kenneth J. Kwasnik, Shelby Township, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 537 days.

(21) Appl. No.: 12/335,795

(22) Filed: Dec. 16, 2008

(65) Prior Publication Data

US 2010/0147129 A1    Jun. 17, 2010

(51) Int. Cl.
*B26D 3/08*     (2006.01)
*B60R 21/20*    (2011.01)

(52) U.S. Cl. ........................................ 83/880; 280/728.3

(58) Field of Classification Search ............... 280/728.3, 280/732; 83/879–887, 331, 346, 347
See application file for complete search history.

(56) References Cited

U.S. PATENT DOCUMENTS

| | | | |
|---|---|---|---|
| 5,082,310 A * | 1/1992 | Bauer | 280/732 |
| 6,337,461 B1 * | 1/2002 | Yasuda et al. | 219/121.62 |
| 6,453,535 B1 | 9/2002 | Nicholas | |
| 6,808,197 B2 | 10/2004 | Bauer et al. | |
| 7,100,941 B2 | 9/2006 | Riha et al. | |
| 7,398,991 B2 * | 7/2008 | Hayashi et al. | 280/728.3 |
| 7,607,681 B2 * | 10/2009 | Okada et al. | 280/728.3 |
| 2003/0051440 A1 * | 3/2003 | Chow et al. | 53/412 |
| 2003/0107203 A1 * | 6/2003 | Bauer et al. | 280/728.3 |
| 2004/0045427 A1 * | 3/2004 | Kang | 83/863 |
| 2004/0164531 A1 * | 8/2004 | Riha et al. | 280/732 |
| 2005/0167956 A1 * | 8/2005 | Yasuda et al. | 280/728.3 |
| 2005/0218631 A1 * | 10/2005 | Soejima | 280/728.3 |
| 2006/0236830 A1 * | 10/2006 | Fischer | 83/13 |
| 2007/0113968 A1 | 5/2007 | Lutze et al. | |
| 2008/0030009 A1 * | 2/2008 | Hayashi | 280/728.3 |
| 2009/0278337 A1 * | 11/2009 | Springer et al. | 280/728.3 |
| 2010/0140264 A1 * | 6/2010 | Hernandez | 220/89.2 |

* cited by examiner

*Primary Examiner* — Stephen Choi
(74) *Attorney, Agent, or Firm* — Paul K. Godwin, Jr.

(57) ABSTRACT

An outer cover layer, for a panel that defines a rupturable deployment door of an air bag deployment system in an automotive vehicle, is formed with an invisible pre-weakened tear seam prior to being overlaid onto the panel. The outer cover layer material is pre-weakened along a defined door opening pattern by a single step impression of a variable depth scoring knife into the under surface of cover layer material. The scoring knife contains a series of cutting edges of varying depth and length along its length that coincides with the seam pattern. The scoring may be performed during the conveyance of the cover layer material by making a single impression of the scoring knife into the lower surface thereof so that the maximum cut depth does not penetrate the outer surface of the material.

8 Claims, 2 Drawing Sheets

PRE-WEAKENED SKIN SEAM FOR AN AIR BAG DEPLOYMENT COVER

BACKGROUND

1. Field of the Invention

This invention relates to the field of air bag deployment covers for an automotive vehicle and more particularly to the area of a cover skin that overlays the panel substrate having a pre-weakened seam formed to rupture during air bag deployment.

2. Description of the Prior Art

Recently, in this technology field, there is a desire to make the air bag deployment door in instrument panels and other locations invisible to occupants of the vehicle and achieve a desired aesthetic for vehicle interiors. Several patents show various techniques and materials used to form cover panels with invisible air bag deployment doors.

U.S. Pat. No. 6,453,535 discloses a process that employs a laser to provide a concealed deployment door and opening in a substrate panel. In that patent, the pre-weakened scoring traces out the door except for bridging tabs which remain to provide support for the door member.

U.S. Pat. No. 6,808,197 discloses a process that employs a multi-axis laser manipulator for providing continuous controlled scoring of the inside of an instrument panel to form a pre-weakened pattern.

U.S. Pat. No. 7,100,941 discloses various techniques for pre-weakening an outer woven material, including weakening the fabric from either the front or backsides by thinning, cutting or melting and by weaving in weaker yarns to define the pre-weakened pattern.

US Application Publication No. 20070113968 discloses the use of a laser to generate a series of apertures in the underside of a leather air bag cover to form a pre-weakened seam.

SUMMARY OF THE INVENTION

The present invention is directed to an improved air bag opening cover layer, such as is located on the passenger side instrument panel of an automotive vehicle. However, the invention is also suited for a steering wheel mounted air bag system or any other location where a pre-weakened and externally invisible tear seam is desired.

With the variety of materials increasing for automotive interiors, it has been found that conventional scoring and pre-weakening techniques are usually multi-step processes to ensure that the area covering a deployment door is invisible to the vehicle occupant and ruptures properly during air bag deployment. The present invention may be implemented by utilizing a variable depth scoring knife on the underside of the cover skin prior to its being overlaid coincident on the substrate with a defined air bag deployment door. By conforming the size and length of the variable depth scoring knife to the full length of the seam to be weakened, the scoring can be performed in a single step, thus resulting in manufacturing efficiencies and cost savings.

The invention is particularly useful when the external skin material layer includes a woven or mesh fabric as part of its laminate make up. In addition, leather, laminated vinyl and other materials which are commonly used on hand wrapped instrument panels may benefit from the present invention. In the preferred embodiment of this invention, the entire pre-weakened seam is formed by a single impression of a knife that creates a continuous score cut of alternating and different depths and lengths. The scoring is accomplished prior to installing the cover material onto the dashboard substrate, and the method is suitable for performance prior to the time the cover material is being prepared for shipment to the instrument panel assembler or fabricator. In the alternative, the process can be performed by the instrument panel assembler or fabricator as the cover material is cut to the appropriate shape and size for hand wrapping onto the instrument panel substrate.

It is an object of the present invention to provide a method for preparing a pre-weakened and invisible seam in the outer cover material layer prior to the cover layer being overlaid onto an instrument panel substrate, whereby the seam is patterned to be approximately coincident with a defined air bag deployment door formed in the substrate.

It is another object of the present invention to provide a device for performing a single scoring step that achieves the formation of a pre-weakened and invisible seam in the outer cover material prior to the cover material being overlaid onto an instrument panel substrate wherein the seam is coincident with a defined air bag deployment door formed in the substrate.

It is another object of the present invention to provide a scoring technique which utilizes a single knife having a plurality of cutting edges of different depths continuously formed in the configuration of the desired pre-weakened and invisible seam to be cut into the underside of the outer cover material prior to the cover material being overlaid onto an instrument panel substrate, whereby the seam is coincident with a defined air bag deployment door formed in the substrate.

It is another object of the present invention to provide a scoring technique in which a series of cuts that are formed in the cover material extend from the underside of the cover material at varying depths in a predetermined pattern of lengths at each depth.

It is a further object of the present invention to provide a cover material for an instrument panel in which the series of cuts defining the air bag tear seam are of alternating first and second cut depths that extend from the underside of the cover material towards the outer surface of the cover material without penetrating the outer surface, wherein the first depth differs from the second depth within the range of 0.25 mm to 1.00 mm.

It is a further object of the present invention to provide method and apparatus for performing invisible seam scoring to the underside of a cover material for an instrument panel in which a single knife having a plurality of spaced apart cutting edges of different depths formed in the configuration of the desired pre-weakened and invisible seam to be cut into the underside of the outer cover material is installed on a roller which engages the underside of the cover material to perform a one step scoring impression on the material as the material is moved with respect to the roller.

DETAILED DESCRIPTION

Figure 1:
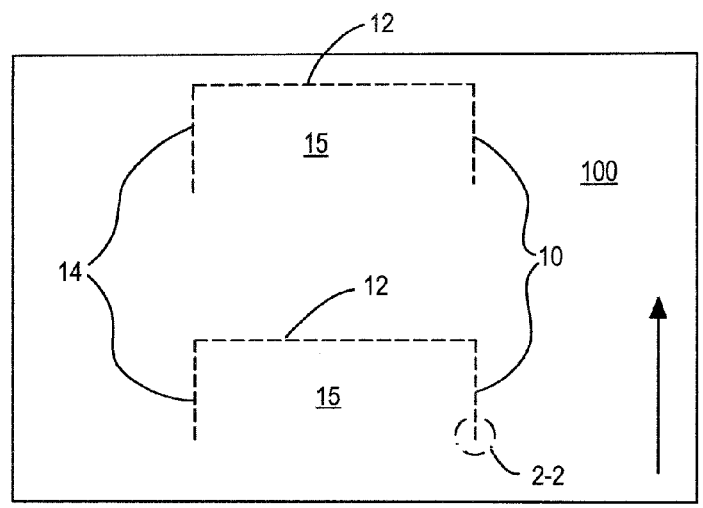
FIG. 1 is representation of a sheet of cover material being moved in a material handling process where invisible tear seams of a predetermined "U" configuration have been formed in the material.

The cover sheet 100, shown in FIG. 1, is depicted as a sheet of vinyl, leather, woven or some laminated and flexible combination of material layer that provide the desired texture and strength suitable for use as the outer cover and skin of an instrument panel of an automotive vehicle. The representation of FIG. 1 is of the cover sheet 100 prior to its being applied to a support substrate that will form part of an air bag deployment system in an automotive vehicle. Cover sheet 100 is shown with an invisible "U" shaped seam pattern 15 having been created thereon as it progresses along a conveyor in the direction of the arrow. Each seam pattern 15 is made up of side seams 10 and 14 and front seam 12 that are continuous. The position of the seam pattern is predetermined to approximately coincide with an air bag deployment door configured in an instrument panel substrate having its own pre-weakened seam and hinge for allowing the air bag to deploy therethrough. The registration of the seam pattern 15 in the cover sheet 100 with the air bag deployment door is made at the time the cover sheet 100 is hand-wrapped and laminated onto the instrument panel substrate. In some applications the seam pattern of the cover sheet 100 will exactly coincide with the rupturable door seam, and in others it will be offset slightly inward or outward of the door seam.

In the present invention, the seam pattern 15 is formed as a continuous score cut of alternating and different depths in the configuration of the desired pre-weakened and invisible seam. The score cut is made into the underside of the cover sheet 100 material prior to the cover material being overlaid onto an instrument panel substrate where it will serve as the outer skin that is seen by the vehicle occupants.

Figure 2:
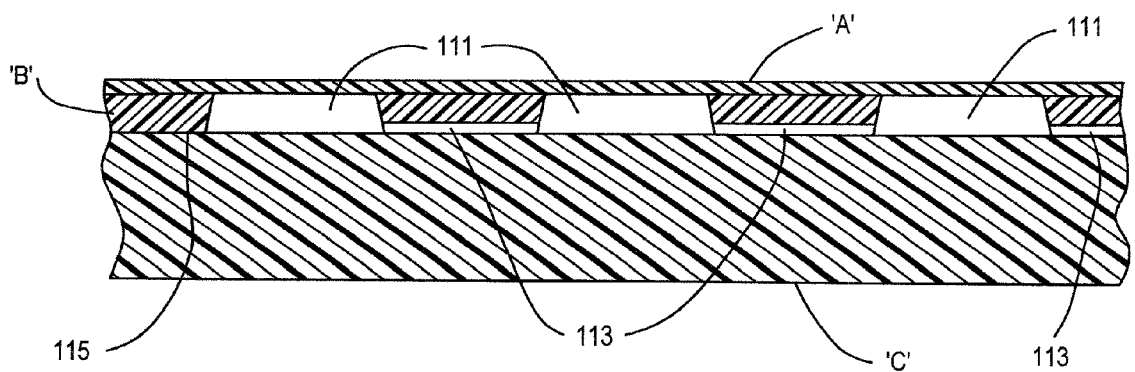
FIG. 2 is a cross-sectional view of a portion of the tear seam formed in a sheet of cover material, as in FIG. 1, and illustrating a series of cuts formed with varying depths in a predetermined repeat pattern of depth.

In FIG. 2, a portion of the score cut that forms seam pattern 15 in FIG. 1, is shown. The portion in FIG. 2 corresponds to the end 2-2 of the score cut 10. In that cross-sectional depiction, the cover sheet 100 is shown as a multilayered material having a lower layer 'B' and an outer surface layer 'A'. In the alternative, the cover material may be formed of many layers or of a single layer. The invention can be applied to any conventional flexible material used as an outer covering for an air bag deployment door panel such as the substrate 'C' shown in FIG. 2. This drawing depicts the cover sheet 100 after scoring and after having been hand wrapped onto the instrument panel substrate 'C' at 115. The scoring pattern shown in FIG. 2 is a continuous cut alternating between a first depth 111 and a second depth 113, which is of a lesser depth than the first cut 111. In this manner, a pre-weakened seam is provided that is invisible when viewed from the outer surface 'A'.

Figure 3:
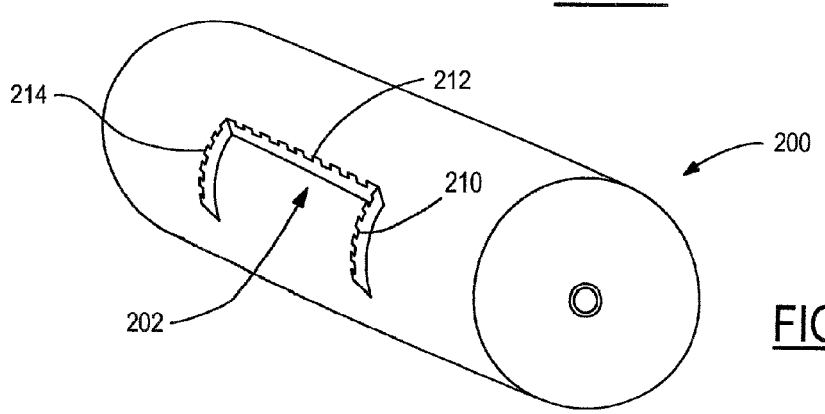
FIG. 3 is a perspective view of a roller in which a scoring knife embodiment of the present invention is mounted.

In FIG. 3, the variable cut scoring knife 202 is shown mounted on a roller 200. The scoring knife is formed with side edges 210 and 214 that are joined to a front edge 212 to provide a continuous cut in the cover sheet 100 shown in FIGS. 1 and 2. The function of the roller 200 is to rotate with the conveyed movement of the cover sheet 100 and to be spaced precisely with respect to the cover material 100 in order that the cut depths, as shown in FIG. 2 can be repeated by the impressing the scoring knife 202 into the underside of the cover sheet 100. In practice, a spacer element (not shown) could be located on the roller surface so as to expose only that portion of the scoring knife sufficient to make the desired depth of cuts into the underside of the cover sheet 100. Due to the depicted configuration of the scoring knife 202 on the roller 200 and its contact with the underside of the conveyed cover sheet 100, the scoring and formation of the desired pattern of a pre-weakened seam is performed in a single impression step. While the variable cut scoring knife 202 is embodied on a roller in FIG. 3, it is believed that one could also mount the knife on other press type mechanisms that are controlled to provide the desired depth of cut at the correct location on the cover sheet 100.

Figure 4:
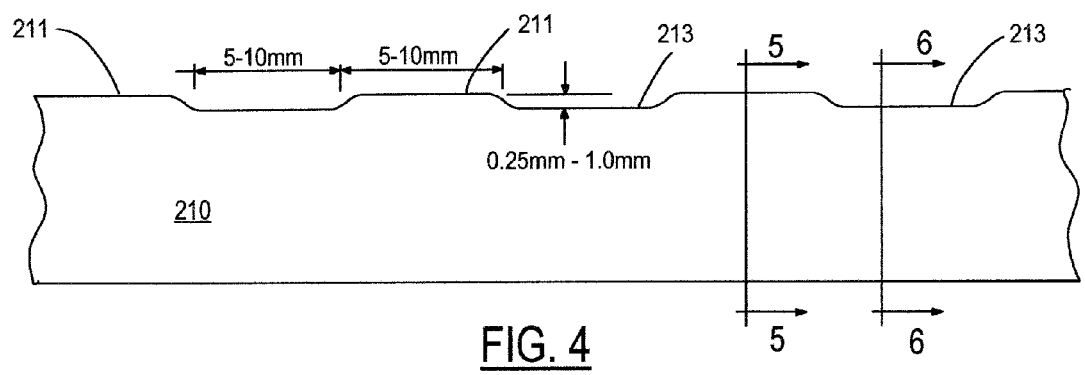
FIG. 4 is an enlarged view of a portion of the cutting edge of the scoring knife shown in FIG. 3.

FIG. 4 is a plan view of a portion 210 of the scoring knife 202. Here, the preferred embodiment is illustrated with a longer extending knife edge 211 alternating with a lesser extending knife edge 213. Although shown as being equal in length, the length of each knife edge is generally selected according to the particular application and tear properties of the cover material. In this embodiment, the lengths are in the range of 5 mm-10 mm and the depth differences are in the range of 0.25 mm-1.0 mm. The selection of the alternating lengths of the knife edges are selected according to the particular properties of the selected cover sheet 100. For instance, the dimensions used to score a 2 mm thickness of leather will most likely be different than a lesser thickness of vinyl or of a woven layered material. Likewise, the selection of score cut depths will be selected according the strength of the cover sheet 100 and its resistance to tearing. For instance, a sheet material having properties that are demonstrated to be relatively high in resistance to tearing may require less variation in edge depth than a material which has properties which are relatively less resistant to tearing. In addition, it may be desired to select depth and length dimensions in a pattern that provides for much less resistance to tearing along the initially opening edge of the underlying door panel than for the side edges.

Figure 5:
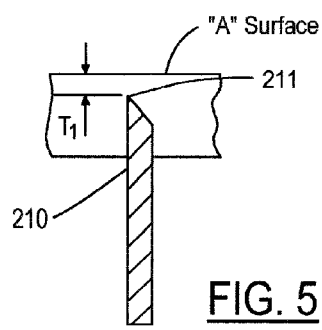
FIG. 5 is a cross-section of the scoring knife shown in FIG. 4 taken along section line 5-5 applied against a cover material.
Figure 6:
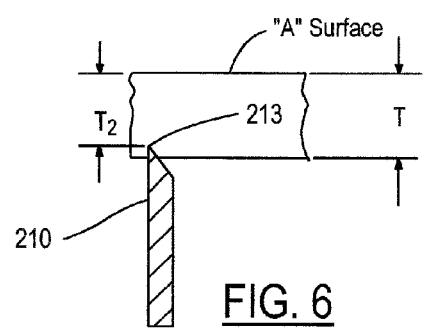
FIG. 6 is a cross-section of the scoring knife shown in FIG. 4 taken along section line 6-6 applied against a cover material.

FIGS. 5 and 6 illustrate cross-sectional views of the portion 210 of the scoring knife 202 taken along respective section lines 5 and 6 in FIG. 4. These figures illustrate how the edges 211 and 213 are forced into the underside of the cover sheet material to a predetermined depth. As shown, a minimal thickness $T_1$ remains above edge 211 and a greater thickness $T_2$ remains above edge 213 in the cover sheet having a thickness T. In this manner, the 'A' surface remains undamaged and the pre-weakened seam remains invisible.

Figure 7:
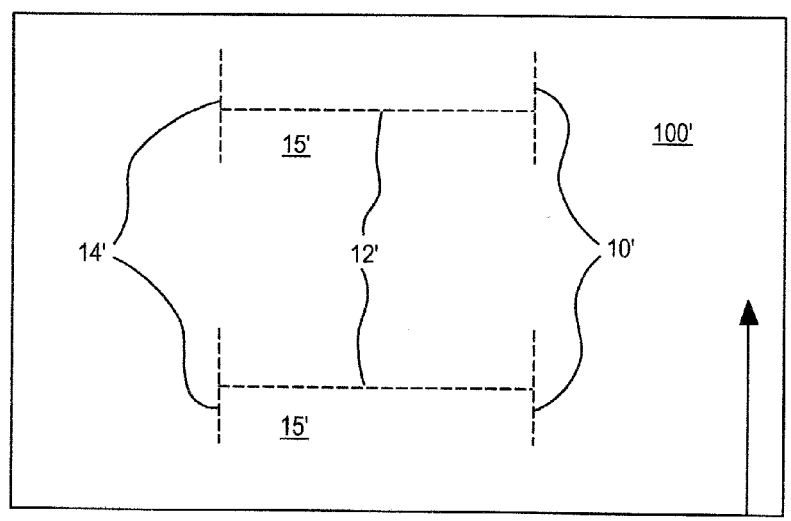
FIG. 7 is representation of a sheet of cover material being moved in a material handling process where invisible tear seams of a predetermined and alternative "H" configuration have been formed in the material.

FIG. 7 illustrates that the present invention may be used in other pre-weakened seam configurations such as an "H" pattern. This pattern is commonly used in steering wheel air bag deployment systems and the present invention may be employed to produce an invisible tear seam in the outer cover material in the manner discussed above.

As can be seen by the drawings and accompanying explanation, the present invention is a unique improvement over conventional air bag covers and methods of providing invisible tear seams in such covers. While the embodiment shown here is the preferred embodiment, it shall not be considered to be a restriction on the scope of the claims set forth below.

We claim:

1. A method for forming a pre-weakened and invisible seam in a flexible outer cover material prior to its application and attachment to a substrate associated with an air bag deployment system of an automotive vehicle, comprising the steps of:

providing said flexible cover material in a sheet having a defined upper surface for exposure to the vehicle passenger space and a defined lower surface for attachment to said substrate;

defining said pre-weakened and invisible seam pattern in a portion of said cover material;

mechanically scoring said cover material as a single impression at varying depths by impressing a single scoring knife with a plurality of cutting edges of different depths continuously configured according to said defined seam pattern;

whereby said scoring step is performed on said defined lower surface and does not penetrate said upper surface.

2. A method as in claim 1, wherein the defined seam pattern is coincident with the rupturing seam of a defined air bag deployment door formed in said substrate.

3. A method as in claim 1, wherein the defined seam pattern is coincident with and slightly offset from the rupturing seam of a defined air bag deployment door formed in said substrate.

4. A method as in claim 1, wherein said scoring knife has a plurality of cutting edges along its length which vary in a predetermined repeat pattern of cutting depths.

5. A method as in claim 1, wherein said scoring knife has a plurality of cutting edges along its length which vary between first and second depths that are repeated along the length of said knife.

6. A method as in claim 1, wherein said scoring knife has a plurality of cutting edges along its length which vary between a first depth of a first length and a second depth of a second length repeated along the length of said knife.

7. A method as in claim 1, wherein said scoring knife comprises a blade having a length that corresponds to said predetermined seam pattern onto a supporting mechanism that is located to oppose said lower surface of said cover material and forcing said mechanism towards said cover material to coincide with said location of said predetermined pattern and with a single impression, cutting into said cover material by a predetermined depth to cause said pre-weakened condition without penetrating said upper surface of said cover material.

8. A method as in claim 7, wherein said knife blade is mounted on a roller and said cover material is conveyed with respect to said roller and said single impression is repeated at separated intervals along said sheet of cover material as it is conveyed.

* * * * *